(12) United States Patent
Chen et al.

(10) Patent No.: US 12,493,634 B1
(45) Date of Patent: Dec. 9, 2025

(54) APPARATUS AND METHOD FOR AUTOMATED REQUEST FOR PROPOSAL AND QUESTIONNAIRE PROCESSING USING ARTIFICIAL INTELLIGENCE

(71) Applicant: Arphie, Inc., San Francisco, CA (US)

(72) Inventors: Michael Chen, San Francisco, CA (US); Chyi-Dean Shu, San Francisco, CA (US)

(73) Assignee: Arphie, Inc., San Francisco, CA (US)

( * ) Notice: Subject to any disclaimer, the term of this patent is extended or adjusted under 35 U.S.C. 154(b) by 0 days.

(21) Appl. No.: 18/903,958

(22) Filed: Oct. 1, 2024

Related U.S. Application Data

(60) Provisional application No. 63/587,947, filed on Oct. 4, 2023.

(51) Int. Cl.
*G06F 16/00* (2019.01)
*G06F 16/28* (2019.01)

(52) U.S. Cl.
CPC .................. *G06F 16/285* (2019.01)

(58) Field of Classification Search
CPC ..................................................... G06F 16/285
USPC ......................................................... 707/740
See application file for complete search history.

(56) References Cited

U.S. PATENT DOCUMENTS

| | | | |
|---|---|---|---|
| 10,951,658 B2 * | 3/2021 | Putz ................... | G06Q 10/0637 707/707 |
| 2008/0071555 A1 * | 3/2008 | Sattler .................... | G06Q 10/06 705/7.29 |

* cited by examiner

*Primary Examiner* — Alexandria Y Bromell
(74) *Attorney, Agent, or Firm* — Cooley LLP

(57) ABSTRACT

A computer implemented method includes importing customer data including previously completed requests for proposals, product documentation, sales materials, security policies and competitor documentation. The customer data is analyzed to form categories. The customer data is processed into chunks of characters to form customer data chunks. The customer data chunks are embedded into context strings. Metadata characterizing customer data lineage is formed. The customer data chunks, the context strings and the metadata are stored in a database.

13 Claims, 3 Drawing Sheets

APPARATUS AND METHOD FOR AUTOMATED REQUEST FOR PROPOSAL AND QUESTIONNAIRE PROCESSING USING ARTIFICIAL INTELLIGENCE

CROSS-REFERENCE TO RELATED APPLICATION

This application claims priority to U.S. Provisional Patent Application 63/587,947, filed Oct. 4, 2023, the contents of which are incorporated herein by reference.

FIELD OF THE INVENTION

The present invention relates generally to the field of artificial intelligence and, more particularly, to an apparatus and method for automating the process of responding to Requests for Proposals (RFPs), Requests for Information (RFIs), Security Questionnaires (SQs), and other B2B questionnaires (collectively referred to as RFPs in this filing) using advanced data management and AI-based answer generation techniques.

BACKGROUND OF THE INVENTION

In many industries, responding to RFPs is a critical, but time-consuming and resource-intensive process. Traditional methods of RFP response often involve manual data gathering, analysis, and content creation, leading to inefficiencies and potential inconsistencies. While some software platforms exist to streamline this process, these platforms do not utilize Large Language Models (LLMs) and Generative AI (GenAI) to bulk-draft RFP answers. These solutions lack the sophistication to handle complex data import and management tasks, as well as the ability to generate contextually appropriate answers using artificial intelligence. Thus, there is a need to provide a comprehensive system for data import, data management, and AI-based answer generation specifically tailored for RFP automation.

SUMMARY OF THE INVENTION

A computer implemented method includes importing customer data including previously completed requests for proposals, product documentation, sales materials, security policies and competitor documentation. The customer data is analyzed to form categories. The customer data is processed into chunks of characters to form customer data chunks. The customer data chunks are embedded into context strings. Metadata characterizing customer data lineage is formed. The customer data chunks, the context strings and the metadata are stored in a database.

DETAILED DESCRIPTION OF THE INVENTION

Figure 1:
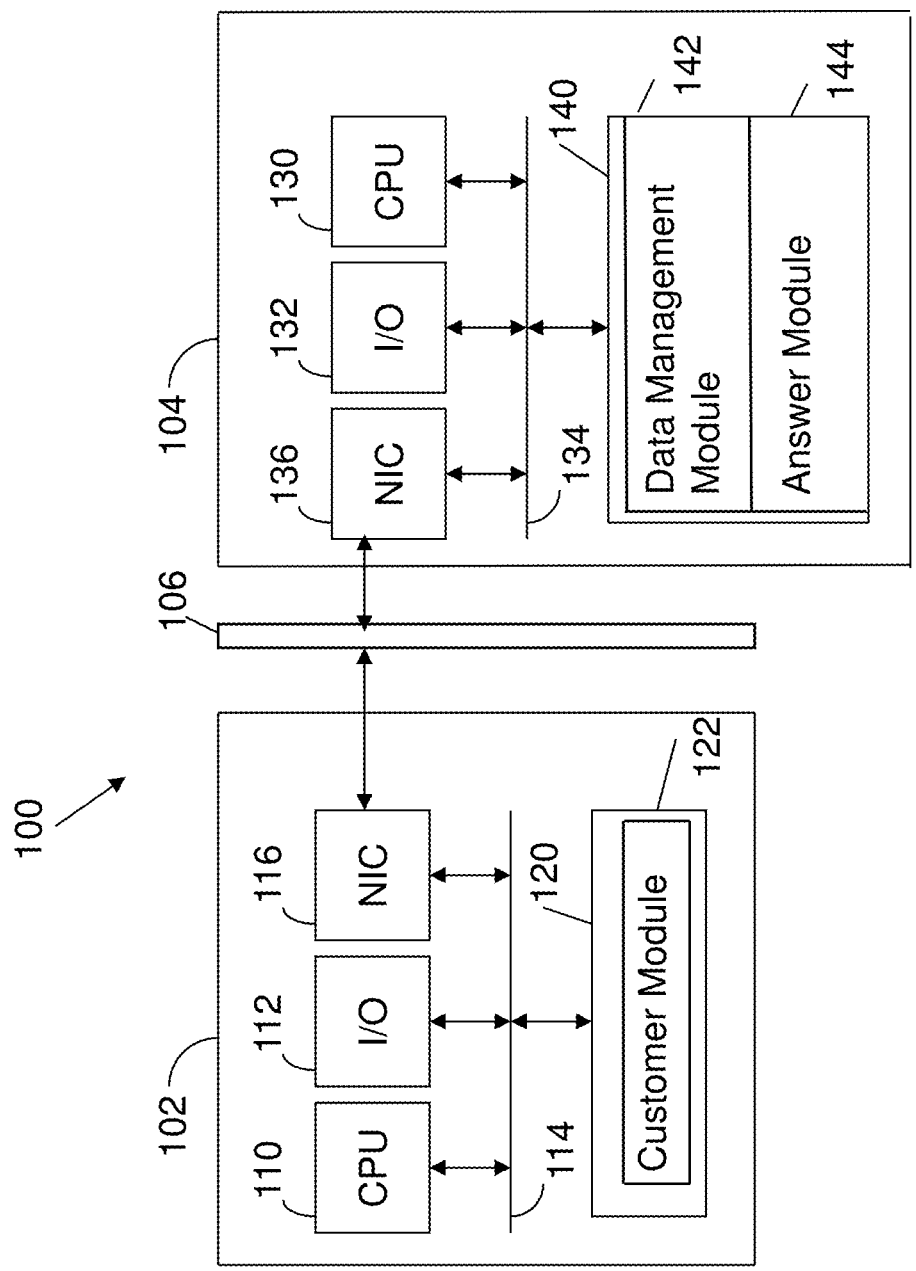
FIG. 1 illustrates a system configured in accordance with an embodiment of the invention.

FIG. 1 illustrates a system 100 configured in accordance with an embodiment of the invention. The system 100 includes a customer machine 102 in communication with a server 104 via a network 106, which may be any combination of wired and wireless networks.

Customer machine 102 includes a processor 110 connected to input/output devices 112 via a bus 114. The input/output devices 112 may include a keyboard, mouse, touch display and the like. A network interface circuit 116 is also connected to the bus 114 to provide connectivity to network 106. A memory 120 is also connected to bus 114. The memory 120 stores a customer module 122 with instructions executed by processor 110 to interact with server 104, as discussed below.

Server 104 includes a processor 130, input/output devices 132, a bus 134 and a network interface circuit 136. A memory 140 is connected to bus 134. The memory 140 stores instructions executed by processor 130. In one embodiment, the instructions include a data management module 142 to implement the operations shown in FIG. 2 and an answer module 144 to implement the operations shown in FIG. 3.

The data management module 142 and answer module 144 automate the RFP response process using advanced data management techniques and artificial intelligence. The data management module 142 is capable of ingesting various types of customer data, including product documentation, sales materials, security policies, and competitor information. This module analyzes the imported data, deploys different strategies for "chunking" the data, and implements context string embedding techniques to optimize data storage and retrieval.

The answer module 144 utilizes the processed data to create appropriate responses to RFP questions. This module employs sophisticated algorithms to analyze user inputs, determine document structure, extract relevant questions, and generate accurate answers using a combination of semantic matching, prompt engineering, and language model integration.

Figure 2:
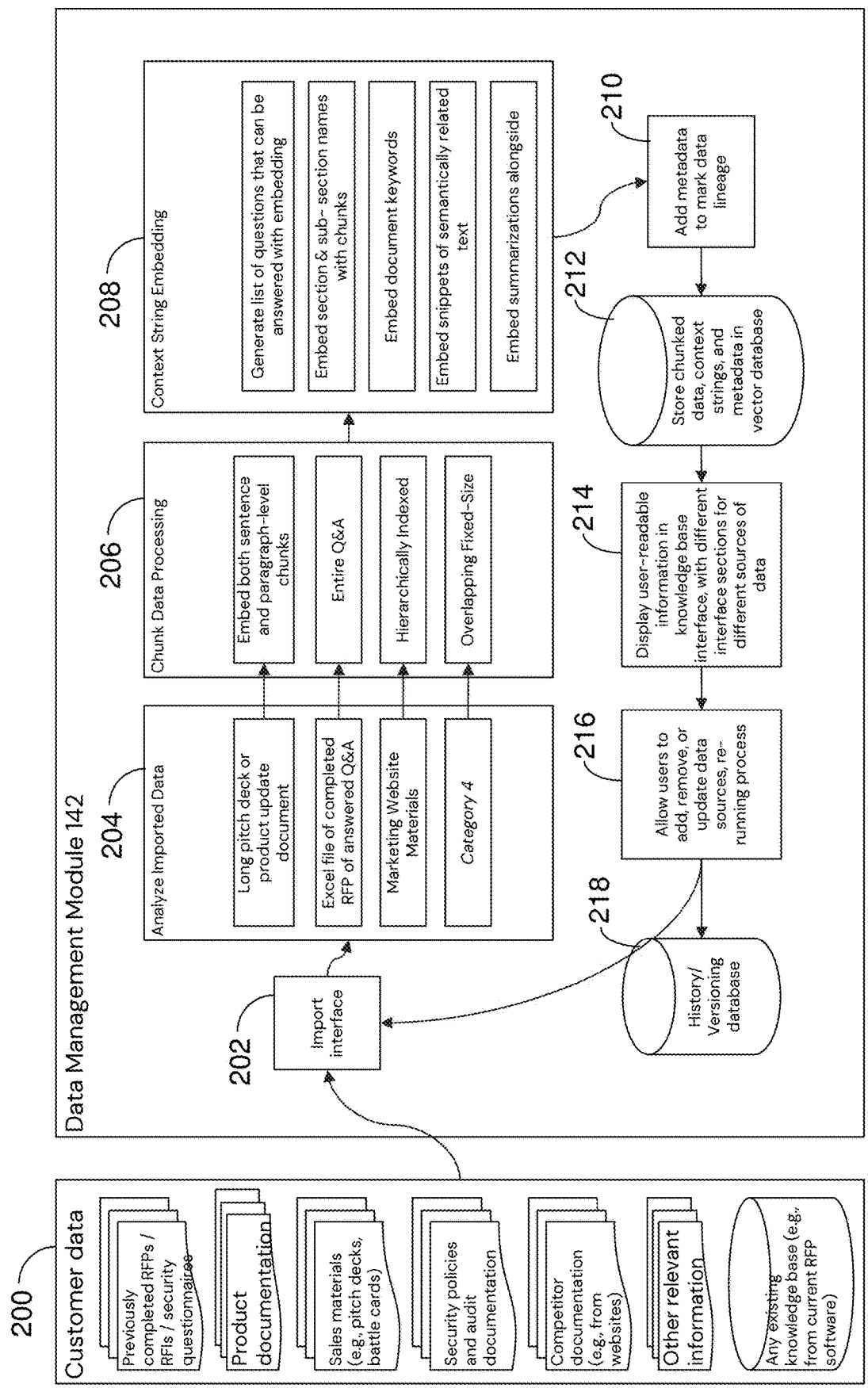
FIG. 2 illustrates data management processing performed in accordance with an embodiment of the invention.

FIG. 2 illustrates operations associated with the data management module 142. The data management module 142 converts structured and unstructured documents and question-and-answer pairs into searchable embeddings. Customer data 200 is imported into the data management module 142 from customer machine 102. The customer data may include:

Previously completed RFPs
Product documentation
Sales materials (e.g., pitch decks, battle cards)
Security policies and audit documentation
Competitor documentation
Other relevant information
Existing knowledge bases (e.g., Q&A library)

After data import through import interface 202, the data is analyzed 204 and placed into categories, such as pitch deck, product information, answered Q&A, marketing website materials and other designated categories. By way of example, the system analyzes the data and deploys different strategies for processing, including:

Analyzing long-form documents (e.g., product update documents)
Processing structured data (e.g., Excel files of completed RFP Q&A)
Handling web-based content (e.g., marketing website materials)

The rules and techniques used to analyze the data are the following:

Use OCR models to extract text from non-text readable formats, such as PDF files and images For text-readable formats, the text is extracted as is.

For structured text formats, like HTML and XML, the text is converted to plain text, dropping formatting such as bolds and italics, but keeping paragraph structural elements like newlines and heading information.

Semantically analyze the entire textual body of the document and extract the following heuristics:

Understand the overall layout of the text—is it a mixture of prose and tables? Is it a grouping of Questions and Answers? This is done by passing the text through a model that can categorize the structure of text and provide labeling paragraph by paragraph. We then leverage the labeling to determine the strategy for optimal text chunking later.

If it is a prose document, chunks are parsed as if the text is one singular block of prose text.

If the document is a grouping of questions and answers, the questions and answer are kept together in individual chunks.

Line-by-line metadata about the categorization of textual data is added-such as, is this block of text likely to be a title, a narrative paragraph, or a table.

These labels are then used in our chunking step, detailed in 206.

Understand the audience, intent, and structure of the document through prompting several LLMs. This metadata is stored alongside the chunks that get processed. Examples are:

Product documentation—the document is highly hierarchical, comprised of a set of nested sections, each of which includes text that explains actions needed to accomplish a certain task.

Technical specifications: the document contains many structured tables in key-value pairs describing one product or feature.

Financial document—this document contains multiple structured tables with multi-column layouts, alongside financial-related prose.

Extract the topics presented in each document for later hierarchical processing. This is also done by leveraging specialized prompts to LLMs.

The system then performs chunk data processing 206. That is, the customer data is processed into chunks of characters to form customer data chunks. The customer data chunks are subsequently turned into searchable embeddings, as discussed below. Chunking may include:

Processing both sentence and paragraph-level chunks

Often, semantic information differs depending on text scope. Shorter sentences record more semantic meaning about the content within that sentence—the facts presented, the wording used, etc. Paragraphs, on the other hand convey more semantic meaning about the relationship between different concepts presented at the sentence level.

To leverage both, for each chunk that we process, we heuristically break up paragraphs into sentences and run both the set of sentences and paragraphs themselves through our embedding model to capture both high-level and low-level semantic meaning.

Processing entire Q&A pairs

A common example for this kind of structured data is the export of a customer's library from a legacy platform, like Upland Qvidian. These outputs are long form documents, but the text within is organized into pairs of text, containing both a question in bold and an answer below in non-bold.

In the previous analysis step, we determined that this document contains a majority of Question-and-Answer style text blocks (alongside some prose at the beginning), so we apply a Q&A chunking strategy to the document.

We apply heuristic based text processing to pair up consecutive blocks of question/answer labels and split the document into a set of pairs. The prose information at the beginning of the document is dropped.

Creating hierarchically indexed content

For documents like documentation, one single document may often refer to a high-level topic overall, but the individual sections within this document may refer to more refined topics that can be sub-categorized under this high-level topic.

Consider a hypothetical end-user document that describes how to execute an autogeneration run for a project within the system.

The high-level topic extracted from the analysis step in 204 is "project autogeneration runs."

The individual sections of this particular document detail where to start the run, what options are available when executing a run, how to track the progress of this run, and troubleshooting steps in case of a run fail.

The sub-topics that are extracted from the analysis step are, respectively, "location in UI", "options," "progress," and "troubleshooting." These topics are then nested under the parent topic of "project autogeneration runs."

When the document is chunked up, the chunks are produced per sub-topic, and relationships are recorded between hierarchical topics.

In the previous example of end-user documentation, chunks are applied to the lower-level sub-topics, but then relationships are written that tie those sub-topics as children of the parent level topic of "project autogeneration run."

This hierarchical structure is then stored within the system as metadata alongside the chunks.

Generating overlapping fixed-size chunks.

When generating the actual chunks themselves, all chunks are generated with slight overlap between the previous chunk and the next chunk location-wise in the document. This is done heuristically with a tunable overlap parameter that is supplied as an input to the overlapping chunker.

This ensures that the system, when processing the context to generate answers for questions, can confidently map two chunks as semantically related.

Context string embedding 208 is then performed. That is, customer data chunks are formed into embedded context strings. Embeddings are n-dimensional mathematical vector representations of text formed by a specialized embedding model. The input to the embedding model is text and the output is an n-dimensional vector. In most cases, the vector is represented as an array of floating-point numbers. The length of the array is determined by the embedding model. An embodiment of the invention uses OpenAI® to produce 1536-dimensional vectors. The vectors allow one to mathematically compute the distance between two pieces of text during semantic matching. A small distance represents semantic similarity.

To optimize data storage and retrieval, the system employs several context string embedding techniques to improve chunk discoverability:

Generating lists of questions that can be answered with embedding

Often, the chunks generated come in paragraph form, as the text they are parsed from are unstructured, long-form text documents. RFP questions, on other hand, are often short and pithy. This can lead to poor semantic matching between questions and raw chunk text, as semantic similarity (specifically, cosine similarity between two embeddings) considers topic and structure similarity.

To boost this similarity match rate, the system generates "discovery questions" at runtime that are embedded alongside the chunks. For example, consider the following chunk about duck migrations:

Duck migrations are remarkable annual journeys undertaken by various duck species. These waterfowl typically travel along established flyways, moving between their breeding grounds in the north and wintering areas in the south. The timing of these migrations is influenced by factors such as day length, weather conditions, and food availability. Some duck species, like the Northern Pintail, can cover impressive distances of up to 3,000 miles during their migration. These journeys are crucial for the ducks' survival, allowing them to access abundant food sources and suitable habitats throughout the year.

Using specific prompting, we leverage an LLM to generate up to three questions that can be answered fully and completely with the chunk text. In this example, the following questions could be generated:

What factors influence the timing of duck migrations?

How far can some duck species travel during migration?

Why are these migratory journeys important for ducks?

These questions are then embedded using the same embedding model as the text and embedded alongside the chunk text itself.

Embedding section and sub-section names with chunks

From the metadata that we parsed in 206, we also have access to the classification of text provided within the chunk—for example, if the text contains a title, or narrative text, or table, etc.

To improve discoverability and semantic match rates, we pull out titles from the text itself and do two things:

First, we embed all title information to the top of the original text chunk to serve as additional context during semantic matching.

Second, we embed the titles and subtitles, including the document name and the chunk text itself to improve the chances of semantic matching.

Embedding question keywords

Like how we parse out topics from chunks as described in 206, we also parse out keywords from the chunks that can aid in improving the semantic match rate for incoming questions.

To do this, we run all chunks through an off-the-shelf specialized keyword extraction model, which returns keywords given a chunk of input text.

The keywords are then embedded alongside the chunk itself.

Embedding snippets of semantically related text

Another piece of metadata that we extract as part of the process described in 204 is the recording of the positional information of chunks relative to each other. Each chunk table entry contains an index property that represents the position of the chunk amongst all other chunks parsed from the same document.

During the question autogeneration runtime detailed below, the index is used to fetch the most immediately previous and most immediately next chunks relative to the current chunk, and all three chunks are passed as context to the autogeneration engine.

If the chunk is positioned at the beginning or end of the file, the "augmented" context will only include the next immediate and next preceding chunks, respectively.

The processed and embedded data is then supplemented with metadata to mark data lineage 210. Data lineage is represented by foreign key relationships from the processed and embedded data back to the system's representation of the original document or question-an-answer pair. The resultant data is stored in a vector database 212. The vector database 212 allows for efficient semantic retrieval during the answer generation phase. In particular, user-readable information is displayed in knowledge base interfaces with different interface sections for different sources of data 214. User can then manipulate the data 216 by adding, removing or updating data sources. The processed data is stored in a history and versioning database 218.

Consider a customer-provided PDF document that has technical specifications about a suite of medical imaging machines for angiopathy patients that is connected to the system via an integration with a third-party file storage system (e.g., Microsoft SharePoint®). Upon fetching the file directly from the third-party file storage system via the integration, the system first passes the file through the parsing system.

The parsing system is a combination of a heuristic-based or OCR-based reader that extracts the raw text from the file. The raw text is then analyzed, organized, and chunked up (separated into smaller, organized pieces of text) based on the contents of the file. In this case, since the file is a technical specification document, the raw text will be broken up into a combination of chunks that contain narrative text, chunks that contain the parsed specification table text, and chunks that contain any other kind of text. All chunks are then organized by detected title elements so that each chunk contains information that is semantically similar and is labeled with additional semantic context.

Finally, the chunks are augmented with metadata based on the contents of the chunk. For example, the chunks that contain narrative text are augmented with summaries of the text in the chunk, while table-based chunks are augmented with aggregate information based on the parsed table—this could be high level aggregations of the data provided in table columns, or row level totals appended to the end of rows, etc. All chunks are augmented with "discovery questions", meaning questions that are generated based on the text in the chunk which aid in semantic similarity matching further in the process, when the chunk is discovered for use as part of answer generation. All chunks are also scanned for customer names that appear within the text, which are then removed to provide better generic performance results, and to minimize the likelihood that undesired references to other customers end up in autogenerated text.

The chunks are then embedded directly within the system's vector database. Based on the type of information contained within the chunks, we choose the right embedding model—i.e. tabular data versus narrative text versus other informational text.

Consider a customer-provided question-answer pair. Upon insertion in the system, the system performs similar steps as described above to analyze the question-answer pair but does not perform chunking on the question-answer pair. Instead, the system generates metadata about the question-answer pair similar to the metadata generated for chunks in the previous example. This includes information such as the topic of the question-answer pair, additional questions that the answer could address, references mentioned within the question-answer pair, etc.

The question-answer pair is then screened for customer names for better generic performance results, and to minimize the likelihood that undesired references to other customers end up in autogenerated text. Based on the type of information contained within the question-answer pair, we choose the right embedding model—i.e. tabular data versus narrative text versus other informational text. The question and answers are embedded separately to allow for maximal discovery and matching but are reconstructed dynamically when used as context for responding to questions.

Figure 3:
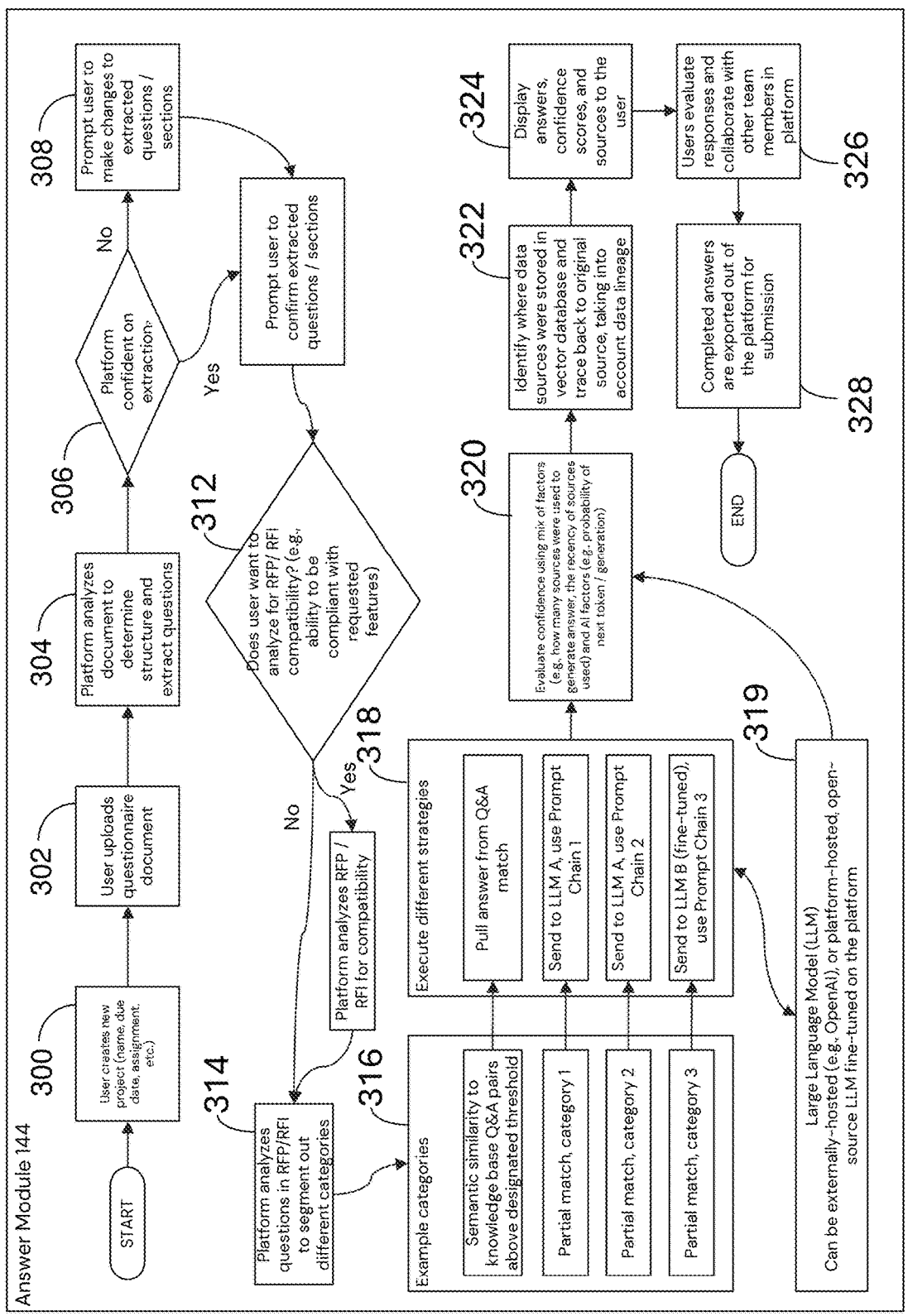
FIG. 3 illustrates answer processing performed in accordance with an embodiment of the invention.

FIG. 3 illustrates processing associated with the answer module 144. A user at customer machine 102 receives from the answer module 144 a user interface with prompts to specify a new project 300. The user uploads an RFP document and provides relevant metadata (e.g., customer name, due date, assignment details) 302. The answer module 144 analyzes the uploaded document to determine its structure and extracts questions 304. The answer module 144 evaluates whether it has sufficient confidence to extract questions automatically 306. If not (306—No), it prompts the user to manually extract or confirm questions and sections 308. The user is then prompted to confirm extracted questions and sections 310.

The answer module 144 then analyzes the extracted questions to determine if they require RFP/RFI compatibility analysis (e.g., checking compliance with requested features) 314. Based on the analysis, the system establishes categories 316. The vector database of the data management module 142 (step 212 of FIG. 2) is used to form categories. Categories may be based upon semantic similarity, Q&A pairs that are semantically similar and other designated categories.

Different strategies are then developed for answer generation 318. For example, a strategy may be based upon semantic similarity matching to existing Q&A pairs. There might be a partial matching and categorization of questions. There might be various prompt engineering techniques with language models.

The answers are generated by sending prompts to a large language model 319. The answer module 144 evaluates the confidence of generated answers using multiple factors (e.g., number of sources used, recency of sources, token probability) 320. Data sources are then identified 322. That is, the vector database of the data management module 142 is queried to trace to original data sources to establish data lineage. Answers are displayed to the user along with confidence scores and source tracing information 324. Users can review, edit, and collaborate on the generated responses within the platform 326. Completed answers are then exported 328.

Throughout this process, the system leverages a combination of Large Language Models (LLMs) provided by third party providers and fine-tuned open source LLMs (which can be self-hosted, on-premise, or cloud-based) to ensure optimal performance and flexibility.

Consider an Excel-based RFP that contains multiple sheets, one for each broad category. The categories span a multitude of topics that the company must respond to:
  General information about the company
  Specific product-related questions for the company's product line A
  Specific product-related questions for the company's product line B
  Questions related to the company's overall information and physical security posture
  Questions related to the implementation and customer success that the prospect can expect The system analyzes the layout of the Excel document, as well as the layout of the individual sheets related to the categories of questions detailed above. It uses heuristics about the text content, the columnar layout, and relationships between cells to apply a first pass, algorithmic labeling of the cells within the Excel document (which cells are questions, which cells should the answer be deposited upon export, which cells require specialized responses like dropdowns, etc.). The system then allows the user to directly edit the labeling of the cells if there are any incorrect assumptions from the first pass algorithmic labeling.

The system uses the following rules and heuristics to determine the appropriate labeling of cells automatically:
  If the cell contains "question" like text, then the question is tentatively labeled as a "question" cell
    "Question" like text is text that contains specific keywords that are present most commonly within questions or contains specific punctuation such as "?" that appear most commonly in questions or has the longest text length within that specific row.
  If the cell is present inside of a row with a question labeled, and the cell is part of a column where the header contains "answer" like header text, then the answer is tentatively labeled as an "answer."
    "Answer" like header text is text that contains words such as "Response" or "Explanation" and is typically where people who complete RFPs will need to fill out their response.
  If the cell is present inside of a row with both a "question" and "answer" labeled already, and there's a dropdown attached to the cell (in Excel, this is known as a data validation), then the cell is labeled as an "option set." An "option set" is a controlled answer, such as "Yes" or "No" that is also part of the RFP response for a specific question.
  These heuristics are applied equally to every single sheet in the RFP except file and allows the system to take a heuristics-based first-pass approach to labeling the RFP cells.

After the questions, answer locations, and other relevant metadata like dropdown locations have been extracted from the document, the user is prompted to run autogeneration on the RFP, which will initiate an AI-based first-draft populating of answers ("AI autogeneration") to the questions. Before initiating AI autogeneration, the user can modify a variety of factors in control of the output, such as word length, structure, verbosity, direct custom instructions, and more. The user can also define what subset of content is eligible to be used to generate answers per question, via the system's tagging feature.

The steps that the system goes through to generate an answer for any one question is as follows:

When we receive a question to autogenerate an answer for, we first go through our context finding step. The context finding step performs the following actions:

Semantic search across our indexed embeddings (as described in 204 through 208). The system first generates an embedding on the question using the same embeddings model that was used to index the content in the indexing step described above. The system then performs a cosine similarity look up search to fetch the 10 closest embeddings. We then use the text associated with those embeddings as part of our context in subsequent steps.

Another technique we use is called Hypothetical Document Embeddings (HyDE). Because embeddings can sometimes be in paragraph format, it can lead to a bad fit for questions, which tend to be shorter and pithier. To combat this, we leverage LLMs to generate hypothetical paragraph texts that could answer the question at hand. We then perform regular semantic matching with those hypothetical paragraphs.

We also perform regular keyword and ranking searches, which leverage keywords in the question to match embedded documents.

If we have matched against a Question-and-Answer from our library, and our semantic cosine similarity is extremely high (>0.95), we assume that the Question from our Question-and-Answer library is roughly the same question. In these cases, we return the Answer from our Question-and-Answer library verbatim.

Otherwise, we then send the question, along with the semantically matched question through two metadata generating steps:

The first is to leverage an LLM call to hypothesize the intent of the question based on the context available.

For example, a question that asks: "What is the maximum focal length of the anterior x-ray sensor?" is likely looking for a direct, factual answer to that question. But a question that asks: "Please describe your company's ESG policy?" is likely looking for a longer, more prose heavy descriptive answer to the question.

This intent is then leveraged in a latter step of our autogeneration process.

The second is to understand the verbosity of the answer required. Again, we leverage an LLM prompt.

In the previous example, the first question is looking for a short, concise answer to the question since it is a factual response, but the second is looking for something longer and more verbose.

After we have computed the metadata, we then perform the actual autogeneration composition step to generate the actual answer. We go through three stages to do this:

The first stage leverages what is known as Chain-of-Thought (CoT) and Chain-of-Validation (CoV) prompting to construct a plan on how to answer the question effectively. This is done via querying an LLM.

The second stage takes the plan that was generated, alongside the question, context, and any formatting inputs from the user and generates a first draft answer to the question. This is a separate prompt and a separate LLM invocation.

The third stage takes the drafted answer and does a final validation pass to rework any part of the answer that does not meet our requirements for a high-quality answer. The requirements are as follows:

The answer should not speculate on any part of the question.

The answer should not make direct reference to the context that was provided, only the information within that context.

The answer should meet all the formatting requirements the user provided.

After the answer generation step, we then perform what is known as the confidence calculation step. This is a mixture of heuristic-based analysis and LLM prompting.

The heuristic-based analysis looks at the metadata of the context that was provided and assigns a numerical score to the "correctness" of the context provided as a whole. The higher the semantic similarity of context provided and the more recent the context was added and verified, the higher the score, and vice versa.

For example, a piece of context that has extremely high semantic similarity (>0.85) but has not been updated for 3 years ago is awarded a low score. A piece of context that has medium semantic similarity but was very recently updated is awarded a higher score. Etc.

We also leverage prompting to understand how complete the answer generated answers the question provided. If it fully and completely answers the question, we provided a HIGH score. If it partially answers the question, we apply a MEDIUM score, and if it does not answer the question at all, then we apply a LOW score.

Finally, the numerical score and the HIGH/MEDIUM/LOW score are combined into a single HIGH/MEDIUM/LOW score by determining how far away negatively or positively the numerical score is from the median of 0.5 and adjusting the categorical score. This final confidence score is then made available to the user in the UI.

We then perform a step to translate the answer to a different language if the user has a language other than US English specified.

Finally, we save the answer, including the context documents that were used to generate the answer back into the system.

The data lineage is tracked via foreign reference keys from the documents back up to the original document that it was chunked from.

These relationships are then surfaced to the user at the UI level.

Consider Question 1, which asks "How many years has your company been in service?" When this question gets queued for AI autogeneration within the system, it is classified as a question that is looking for a direct fact. As a result, the system looks for resources and artifacts that have been indexed that are closely related to this question and references a direct fact about the company's age. Depending on the number of sources that are discovered, and the relevance and the recency of those sources, the system filters the sources that are the most desirable to answer the question.

The system then passes the sources and a set of instructions to the LLM to generate a first draft response. If the user provided custom instructions at time of AI autogeneration, this is also considered. The system then takes all the factors mentioned into account to compute a confidence score for the answer, based on factors such as the quantity, relevance, and recency of sources that were used by the LLM to answer the question.

Consider Question 2, which asks "Describe how Product A's collaboration workflow allows users to comment on, tag, and reference other users." When this question gets sent down for autogeneration within the system, it is classified as a question that is looking for a descriptive answer. As a result, the system looks for longer form, most structurally semantically similar sources that could both help guide the content of the response and the structure of the response. This is considered by the system as it generates a different kind of response for Question 2. Similar to Question 1, the system then takes into account the quantity, relevance, and recency of sources to compute a confidence score, which, in this case, also considers the effectiveness of the answer and also the structure of the answer.

The invention is more fully appreciated in connection with a description of the processing of the following questionnaire in Table 1.

TABLE 1

|   | A | B | C | D |
|---|---|---|---|---|
| 1 | Topic | Questions | Yes/No | Answer |
| 2 | 0. Company Overview | Provide the name of your CEO | | |
| 3 | 1. Capabilities | Does your software provide templates? | | |
| 4 | 2. Security | Does your platform support Single Sign On (SSO)? | | |
| 5 | 3. Compliance | List the compliance certifications your software holds (for example, ISO 27001, HIPAA, GDPR, etc.) | | |

The system uses a heuristics-based approach to automatically label cells within the uploaded file into three different categories: question, answer, and option set. Below is a description of what each cell is automatically labeled as, and what rules led to that cell being labeled as such:

Row 2
    Cell B2—labeled as "Question"
        Rule 1: Cell is the longest, character wise in its row
        Rule 2: Cell is in a probably question column (the header of column B contains the word "Questions")
        Rule 3: Cell is within the first few columns on the left of the spreadsheet
    Cell C2—Labeled as "Option Set"
        Rule 1: Cell contains an Excel validation rule, which constrains the acceptable values in the cell to Yes or No.
        Rule 2: Cell is right of the proposed question cell for the row
        Rule 3: Cell is currently empty
    Cell D2—Labeled as "Answer"
        Rule 1: Cell is currently empty.
        Rule 2: Cell is right of the proposed question cell for the row.
        Rule 3: Cell is probably an Answer column (based on "Answer" appearing in the header row at the top)

Row 3
    Cell B3—labeled as "Question"
        Same rationale as B2
    Cell C3—labeled as "Option Set"
        Same rationale as C2
    Cell D3—labeled as "Answer"
        Same rationale as D2
Row 4
    Cell B4—labeled as "Question"
        Same rationale as B2
    Cell C4—labeled as "Option Set"
        Same rationale as C2
    Cell D4—labeled as "Answer"
        Same rationale as D2
Row 5
    Cell B5—labeled as "Question"
        Same rationale as B2
    Cell C5—labeled as "Option Set"
        Same rationale as C2
    Cell D5—labeled as "Answer"
        Same rationale as D2

The user can then manually label the first column as "Section," as the system does not have an automatic way to detect this. After the user confirms their selection and the automated labeling as described above, the system converts the labels into a Project.

A project is the top-level organization of an RFP.

Project can contain sections, which are the organizational units of questions within a project. In the example above, each value in column 1 will be converted into a section.

Sections then contain questions. In this example, each section only has a single question.

Each question must have an answer to be considered complete, the answer eventually provided by the system through autogeneration or manually by the user will be placed back into the cell labeled "Answer" in the same row as a cell labeled as "Question" for the corresponding question.

If there was an "option set" labeled in the same row the answer will also require the user to select an option amongst the available validation options (in the example above, they are Yes and No).

Autogeneration

The user then uses the UI to run autogeneration on the four questions in the RFP. Below are the details for how one such run is executed for the first question.

1. Question 1—Provide the name of your CEO
    a. Step 1: Run semantic matching on the question.
        i. Strip the question of any newlines and replace them with spaces.
        ii. Send the question to a pre-trained, off the shelf embedding model (e.g., OpenAI's text-embedding-ada-002®)
        iii. The response of the embedding model will be a nth dimensional floating-point vector.
        iv. Make an augmented SQL request to the vector database to match against this question embedding.
            1. Rule 1: Use the cosine similarity strategy to determine closeness between vectors (this is industry standard).
            2. Rule 2: As part of the SQL request, filter the indexed embeddings (in the knowledge base) that are only part of the same customer organization.

a. This is to ensure data is not leaked between different customer organizations.

3. Rule 3: After we receive the raw matched embeddings from the SQL query, run tag matching to filter further.

a. Users can append tags to questions and resources in the knowledge base which will determine what can or cannot be considered a match, even if the embedding similarity is high.

b. Tags are considered exclusionary and are part of a tag group. For example, "product" is a tag group that can contain "Product A" and "Product B". If a question is tagged with "Product A", it will not match against embeddings that are tagged with "Product B".

b. Step 2: Perform transformation on the retrieved semantic matches according to the following rules:

i. Rule 1: If the semantic match is the embedding of a Question-and-Answer pair, make a SQL query to reconstruct the entire Q&A and use that as part of the context in the following Steps.

1. We do this because questions and answers are emedded separately from each other to maximize match probabilities.

ii. Rule 2: If the semantic match is the embedding of a Discovery Question (see 204), then make a SQL query to fetch the associated chunk and use that instead as part of the context in the following Steps.

iii. Rule 3: If the semantic match is the embedding of a part of an unstructured document, make a SQL query to fetch topics/subsections/document name to include alongside this chunk as part of the context in the following Steps.

c. Step 2: Run the question through a query intent prompt to an LLM system to determine the underlying intent of the question.

i. Example query intent prompt:

1. System Prompt: You will be given a prompt in the form of a question or a statement. Please determine the intent of what the prompt is looking for in a response. Respond with just a summary of this intent.

2. User Prompt: Provide the name of your CEO.

ii. Example query intent response:

1. "The intent of this question is to provide who the current CEO is."

d. Step 3: Run the question though a conciseness (verbosity) prompt to an LLM system to determine the expected verbosity of the response.

i. Example verbosity prompt:

1. System Prompt: You will be given a prompt in the form of a question or a statement. Please determine whether the prompt is looking for a response that is either a direct fact or a detailed explanation.

a. Some examples are:

i. If the prompt is "Company Name:" or "Date", it is considered "{ConcisenessType.FACT}"

ii. If the prompt is "How do you handle incidents?" it is considered "{ConcisenessType.EXPLANATION}"

2. User Prompt: Provide the name of your CEO.

ii. Example conciseness response:

1. ConcisenessType.FACT e. Step 4: Execute a CoT (Chain of Thought) prompt to generate the first pass thinking plus draft of the response for the question, given the context we have constructed thus far.

The prompt that we use for this step is as follows:
Question:
<question>
Provide the name of your CEO.
</question>
Intent:
<intent>
The intent is to obtain the name of your company's CEO.
</intent>
Documents
<Documents>
   <document id="cfb3a341-481a-4b49-9dc5-936e0cbf261d">
      <document_content>
[Document Name: Investor Relations Teams.html]
Built by former leaders at world-class companies.
Experienced in artificial intelligence, building technology products, go-to-market, and bid & proposal management.
Fill out questionnaires 10× faster
Arphie's AI (Arphie is the assignee of the subject patent application) engine helps teams accurately speed through DDQs and RFPs, with high accuracy and compliance-so you can get back to other strategic priorities.
Pull compliance-approved answers first—then fall back on Gen AI written first drafts
      </document_content>
   </document>
   <document id="61b54c87-3902-42f5-b29c-c7c5b1522bel">
      <document_content>
[Document Name: Security.html]
Employee Security Training
Security is a priority for the entire company. Every year, all employees go through a security training program and follow the best practices for managing customer data.
Arphie Policies & Procedures
Arphie's system for managing information security follows the best practices in the industry. This system ensures that working with Arphie is reliable, consistent, and secure for customers.
Arphie FAQ
      </document_content>
   </document>
   <document id="b713315b-4aa5-4aff-852a-9c62c69d4e2d">
      <document_content>
[Document Name: Terms of Use.html]your physical or electronic signature;
identification of the copyrighted work(s) that you claim to have been infringed;
identification of the material on our services that you claim is infringing and that you request us to remove;
sufficient information to permit us to locate such material;
your address, telephone number, and e-mail address;
      </document_content>
   </document>

```
<document         id="03cb6704-7d95-48da-b505-
    45918011ddfa">
<document_content>
[Document Name: Best Practices Series: The Go/No-
    Go Decision.html]
VP of Sales must be bought in that an escalation is
    necessary.")
</document_content>
</document>
<document         id="1129df5e-c08d-4268-9f1e-
    983fa25367aa">
<document_content>
[Document Name: Terms of Use.html]
Third-Party Links & Ads; Other Users
</document_content>
</document>
<document         id="b9ef1b8c-936d-4317-9b09-
    b40aae2fb726">
<document_content>
[Document Name: Arphie—Privacy Policy.html]
Contact us
FeaturesIntegrationsResourcesSecurityAbout
Contact Sales
Privacy Policy
Last updated Nov. 28, 2023
</document_content>
</document>
<document         id="be9e1cd8-5e66-4504-a0ab-
    0ee008079a63">
<document_content>
[Document Name: Arphie-Live Integrations to Com-
    pany Information.html]
Contact us
FeaturesIntegrationsResourcesSecurityAbout
Contact Sales
Arphie's Integrations
</document_content>
</document>
<document         id="e7086326-7cd9-4df9-91e5-
    7bcbc976c6e2">
<document_content>
[Document Name: Terms of Use.html]
these Terms.
</document_content>
</document>
<document         id="85adde03-ea7b-403c-9f02-
    76e2b966c3a9">
<document_content>
[Document Name: Terms of Use.html]
Disclaimers
</document_content>
</document>
<document         id="9979c9d8-275c-4b22-bd5f-
    741eea868d24">
<document_content>
[Document Name: What is an RFP, and How to
    Respond to RFPs.html]
Conduct a Go/No-Go Analysis: Consider whether pursu-
    ing the RFP is strategically aligned with your business
    goals and whether you have a competitive chance of
    winning.
Key Steps in Crafting a Winning Proposal
Executive Summary:
Provide a concise overview of your proposal, highlighting
    your unique value proposition.
Detailed Approach:
Describe your methodology, including how you plan to
    meet the project's objectives, timelines, and deliver-
    ables.
</document_content>
</document>
</documents>
Formatting Instructions for LLM:
<formatting>
    This question is asking for a response that is a direct
        fact
    Provide a concise and direct answer that is short and to
        the point. Answer the question with the minimum
        information to satisfy the question intent. Do not
        include any additional details or elaboration.
    Use no more than 100 words in your response.
    Respond using prose and paragraphs.
</formatting>
Style Instructions for LLM:
<style>
    Write from the perspective of Arphie, but never in first
        person.
    Use only information from the documents provided and
        nothing else.
    Do NOT start the responses with "At Arphie,"
    Do not include more information than is needed to
        answer the question.
    Do not mention whether something is included in the
        provided context or documents or facts.
    Do not mention "the documents" or "the context" or
        "the facts".
    Do not mention if anything is explicitly stated or not.
    Do not include phrases such as "it's important to note"
        or "please note".
    Do not use speculative language.
    If part of the question cannot be answered given a lack
        of context, leave that part out of the answer.
    If there is no context in the documents to be able to
        respond to the question, respond with "This question
        cannot be answered given lack of supporting
        sources."—do not explain why.
</style>
Additional Instructions for LLM:
<additional-instructions>
</additional-instructions>
Using <thinking> tags, think before you write the answer
    to the question. First, using the intent and the question
    itself, expand on what the underlying purpose behind
    the question. For example, if the question is a require-
    ment, think about whether or not the requirement is
    met. Then, using the documents provided, think
    through which documents work well in favor of
    answering the question, given the intent. Then,
    acknowledge that you should omit responding to parts
    of the question where there is not enough information
    to do so. Finally, using your own <thinking>, compose
    a response to the question provided and write the
    answer in <composition> tags. Make sure to follow
    <formatting and <style> instructions closely. Cite your
    sources in <references>, where you should write
    empty, self-closing <reference> tag that have an id
    attribute.
The Response received from the LLM prompts is as
    follows:
<thinking>
The underlying purpose of this question is to identify the
    current leadership of Arphie, specifically the CEO. This
``` information is often sought to understand the company's top-level management and potentially gauge the direction or vision of the company. However, after reviewing the provided documents, there is no explicit mention of Arphie's CEO or any named leadership positions. The documents mainly focus on general company information, services, and policies. Without specific information about the CEO, it would be inappropriate to speculate or provide a name. Therefore, the best approach is to acknowledge that this information is not available in the given context.
<composition>
This question cannot be answered given lack of supporting sources.
</composition>
   f. Step 5: Using the response from the CoT prompt above, execute a reflection prompt—the goal of this prompt is to refine the answer and remove any unwanted language or context.
The prompt that we use is as follows:
<thinking>
The underlying purpose of this question is to identify the current leadership of Arphie, specifically the CEO. This information is often sought to understand the company's top-level management and potentially gauge the direction or vision of the company. However, after reviewing the provided documents, there is no explicit mention of Arphie's CEO or any named leadership positions. The documents mainly focus on general company information, services, and policies. Without specific information about the CEO, it would be inappropriate to speculate or provide a name. Therefore, the best approach is to acknowledge that this information is not available in the given context.
</thinking>
<composition>
This question cannot be answered given lack of supporting sources.
</composition>
Now, reflect on the <composition> you just wrote. If the answer is This question cannot be answered given lack of supporting sources., return that. Otherwise, if you mentioned anything about provided information, provided facts, provided context, or anything at all about information that was missing or not provided, remove that from the composition. Return only the text of the resulting composition.
The Response returned from this LLM prompt is as follows:
This question cannot be answered given lack of supporting sources.
   g. Step 6: Execute a translation prompt to translate the response to the right language and locale spelling.
     i. System Prompt: You are an expert translator and spelling corrector. You will receive a piece of text and a language to translate into. Your job is to translate the text into the desired language without losing any content or correct spelling to be in the specified locale.
     ii. User Prompt: {query_params.text_to_translate} Transate the text above into {query_params.locale_description} using proper {query_params.locale_description} spelling. Ensure all information present within the original text is present in the translated text. If the text contains HTML tags, keep the HTML tags as is. Return only the text, and nothing else. If the text does not need translation, correct any spelling to be in proper {query_params.locale_description} spelling.
     iii. Response: This question cannot be answered given lack of supporting sources.
   h. Step 7: Save the response and metadata about the context used to generate that answer back to the system's database.
     i. To tie the answers back to the context used to generate that answer, we write database entries that have foreign key relationships between the id of the documents (the chunks used to generate the answer) and the answer entry in our database.
     ii. When users then view the answer in the UI, we do a SQL query using these foreign key relationships to fetch the documents that were used as part of the context and displayed in a side panel.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
importing customer data including previously completed requests for proposals, product documentation, sales materials, security policies and competitor documentation;
analyzing the customer data into categories;
processing the customer data into chunks of characters to form customer data chunks, wherein the customer data chunks include sentence level character groupings, paragraph level character groupings, question and answer groupings, hierarchically indexed groupings and overlapping fixed-size groupings;
embedding the customer data chunks into context strings;
adding metadata characterizing customer data lineage;
storing the customer data chunks, the context strings and the metadata in a database;
ingesting a new request for proposal; and
segmenting different categories within the new request for proposal.

2. The computer implemented method of claim 1 wherein the data categories include pitch deck, product information, structured data file, and marketing materials.

3. The computer implemented method of claim 1 wherein each context string is an n-dimensional mathematical vector representations of text.

4. The computer implemented method of claim 1 where a context string embeds document keywords.

5. The computer implemented method of claim 1 wherein a context string embeds snippets of semantically related text.

6. The computer implemented method of claim 1 wherein a context string embeds summarized text.

7. The computer implemented method of claim 1 wherein the different categories are based upon semantic similarity.

8. The computer implemented method of claim 1 further comprising deriving answers from a large language model based upon a strategy.

9. The computer implemented method of claim 8 wherein the strategy is based upon a question-and-answer match.

10. The computer implemented method of claim 8 wherein the strategy specifies the need to identify a fact.

11. The computer implemented method of claim 8 wherein the strategy specifies the need to obtain a narrative.

12. The computer implemented method of claim 8 further comprising ascribing a confidence score to an answer.

13. The computer implemented method of claim 8 further comprising establishing data lineage within an answer by referencing the database.

* * * * *